United States Patent
Sugiyama

[11] Patent Number: 6,094,224
[45] Date of Patent: *Jul. 25, 2000

[54] MOVING IMAGE CODING DEVICE

[75] Inventor: Kenji Sugiyama, Kanagawa-ken, Japan

[73] Assignee: Victor Company of Japan, Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,256

[22] Filed: Jun. 11, 1997

Related U.S. Application Data

[63] Continuation of application No. 08/413,482, Mar. 30, 1995, abandoned.

[30] Foreign Application Priority Data

Mar. 31, 1994 [JP] Japan .................................. 6-086044

[51] Int. Cl.[7] .................................................. H04N 7/12
[52] U.S. Cl. ........................................ 348/412; 348/387
[58] Field of Search ..................... 348/384, 390, 348/400, 401, 403, 407, 409, 412, 415, 420, 387; 370/535, 537, 540, 538

[56] References Cited

U.S. PATENT DOCUMENTS

| | | | |
|---|---|---|---|
| 4,215,369 | 7/1980 | Iijima | 348/387 |
| 4,455,649 | 6/1984 | Esteban et al. | 370/447 |
| 4,713,776 | 12/1987 | Araseki | 348/398 |
| 4,951,140 | 8/1990 | Ueno et al. | 348/413 |
| 5,115,309 | 5/1992 | Hang | 348/388 |
| 5,216,503 | 6/1993 | Paik et al. . | |
| 5,231,384 | 7/1993 | Kuriacose | 348/426 |
| 5,309,232 | 5/1994 | Hartung et al. | 348/384 |
| 5,317,397 | 5/1994 | Odaka et al. | 348/416 |
| 5,319,457 | 6/1994 | Nakahashi et al. | 348/387 |
| 5,361,096 | 11/1994 | Ohki et al. | 348/387 |
| 5,481,543 | 1/1996 | Veltman | 348/423 |
| 5,530,598 | 6/1996 | Arai et al. | 386/112 |
| 5,550,589 | 8/1996 | Shiojiri et al. | 348/423 |
| 5,550,590 | 8/1996 | Sakazawa et al. | 348/387 |

FOREIGN PATENT DOCUMENTS

| | | |
|---|---|---|
| 515101 | 11/1992 | European Pat. Off. . |
| 643537 | 3/1995 | European Pat. Off. . |
| AL 6-165153 | 3/1994 | Japan . |
| 6165153 | 6/1994 | Japan ........................... H04N 7/133 |

OTHER PUBLICATIONS

Patent Abstracts of Japan vol. 17, No. 65 (E–1317), Feb. 9, 1993 and JP–A–04 271587 (NEC Corp.) Sep. 28, 1992.
Patent Abstracts of Japan vol. 7, No. 264 (E–212), Nov. 24, 1983 and JP–A–58 (Fujitsu) Aug. 30, 1983.

*Primary Examiner*—Wendy Garber
*Assistant Examiner*—Aung S. Moe
*Attorney, Agent, or Firm*—Eugene Lieberstein; Michael N. Meller

[57] ABSTRACT

A moving picture coding device comprises a plurality of coders for periodically performing, with respect to respective moving picture signals, a first coding and a second coding having a code amount of field or frame larger than that of the first coding, a multiplexer for multiplexing codes outputted from the coders and a coding controller for generating a control signal for preventing timing of the second coding performed by the coders from being overlapped. A variation of code amount of multiplexed codes is reduced and a delay time caused by a buffer for absorbing such variation is reduced.

2 Claims, 4 Drawing Sheets

MOVING IMAGE CODING DEVICE

This application is a continuation of application Ser. No. 08/413,482, filed Mar. 30, 1995 abandoned.

BACKGROUND OF THE INVENTION

1. Field of the Invention

The present invention relates to a device for high performance coding a plurality of moving image signals and broadcasting or transmitting them simultaneously and, particularly, to a moving image coding device thereof, which uses an inter-frame or inter-field prediction.

2. Description of the Prior Art

Besides an analog broadcasting system such as NTSC, a technique in which a moving image signal is digitized and a resultant digital data stream is broadcast through a satellite broadcasting, ground wave broadcasting or CATV system is having been studied.

In such technique, when a high performance coding method is used to digitize the moving image signal, it is possible to transmit a plurality of images through a transmission path of a conventional one image channel. For example, a transmission path for transmitting an FM modulated NTSC signal has a band width of about 27 MHz. This band width allows a digital data of about 30 Mbps to be transmitted. Since, when the NTSC signal is coded by using the motion compensation inter-frame prediction, a sufficient image quality is obtainable by about 10 Mbps, it is possible to transmit three kinds of moving image through the transmission path of 30 Mbps.

When such broadcasting signal is recorded by a digital VTR, it can be considered to record a code train as it is and to decode it when it is to be reproduced. In such case, if the signal is coded by using the inter-frame prediction, it is impossible to perform a high speed search for reproducing only a specified frame in the successive frames. In order to solve this problem, one frame per several frames is independently intra-frame coded according to, for example, MPEG (Moving Picture Experts Group) system standardized by ISO (International Organization for Standardization). In this case, although the inter-frame prediction coding is usually a cyclic prediction, an accumulation of error due to signal processing error and/or transmission code error is prevented by interrupting the inter-frame prediction periodically and intra-frame coding independently. This scheme is referred to as refresh of error. A frame which is intra-frame coded independently is referred to as I frame. In the high speed search, only the I frame is reproduced. Although the term "frame" can be changed to "field", the following description will be made with reference to "frame".

Conventional Coding Device

FIG. 1 is a block diagram of an example of a conventional moving picture coding device for digitally broadcasting two kinds (2 channel) of picture signal. There are provided two coders which are basically the same and code the respective moving pictures.

In FIG. 1, a signal of a picture a inputted from an input terminal 1 is supplied to a subtracter 5 and a picture type setting device 41. A signal of a picture b inputted from an input terminal 11 is supplied to a subtracter 15 and a picture type setting device 42.

The subtracter 5 subtracts a prediction signal from the input signal a. A residual signal obtained by the subtracter 5 is supplied to a coder 6. In the coder 6, the DCT (Discrete Cosine Transform) is performed. A coefficient obtained by the DCT is quantized with a predetermined step width and variable-length coded. A data train thus compressed is supplied to a buffer 43 and a decoder 8. The buffer 43 absorbs a variation of the amount of code caused by the variable-length coding to make a transfer rate of the data train substantially constant and supplies it to a multiplexer 100. The decoder 8 performs a processing which is reverse to that performed by the coder 6 and outputs a reproduced residual signal. An adder 7 adds a prediction signal supplied from an inter-frame predictor 3 to the reproduced residual signal supplied from the decoder 8. The reproduced picture signal output from the adder 7 is sent to the inter-frame predictor 3.

The inter-frame predictor 3 delays the reproduced picture signal by 1 frame and outputs it as a inter-frame prediction signal which is supplied to the subtracter 5 and the adder 7 through a switch 4.

A movable terminal of the switch 4 is connected to the inter-frame predictor 3 when a picture type information supplied from the picture type setting device 41 indicates a unidirectionally predictive frame (P frame: Predictive-Frame) and is connected to the 0 value and cuts the predictive signal when the picture type is an intra-frame (I frame). When the predictive signal is cut, the input picture signal is supplied to the coder 6 as it is, so that the intra-frame independent coding is performed.

The P frame means a frame which is coded by the inter-frame prediction coding by using a predictive signal produced from a preceding frame and the I frame means a frame which is intra-frame coded independently without using the inter-frame prediction.

The selection of a frame to be set as the I frame is performed by the picture type setting device 41 with a frame sync timing of the input picture. The picture type information from the picture type setting device 41 is supplied to the switch 4 and multiplexed with the data train from the buffer 43 by the multiplexer 100 and sent to a decoding device.

The timing of the I frame setting may be every 20 to 30 frames for a high speed search and/or error refresh during a VTR recording. In this case, since the amount of code of the I frame is 5 to 10 times that of the P frame, the amount of code generated varies frame to frame considerably. In order to absorb such large variation, a buffer having large capacity is required.

Alternatively, there is a method in which an independent picture is set not frame unit but a portion of a frame which may be one tenth of one frame and the portion is shifted every refresh so that the whole image is refreshed for about 1 second. In such case, the buffer capacity may be small. However, a search picture during a VTR recording is divided, causing a monitor to be difficult.

Operations of a subtracter 15, a coder 16, a buffer 44, a decoder 18, an adder 17, an inter-frame predictor 13, a switch 14 and the picture type setting device 42 for the picture b are the same as those of the subtracter 5, the coder 6, the buffer 43, the decoder 8, the adder 7, the inter-frame predictor 3, the switch 4 and the picture type setting device 41 for the picture a, respectively.

The multiplexer 100 multiplexes the output of the buffer 43, which is the data train of the picture a, with an output of the buffer 44, which is a data train of the picture b, and outputs a multiplexed data train from a data output terminal 20.

Conventional Decoding Device

An example of a conventional decoding device for reproducing a data train supplied thereto will be described with reference to FIG. 2.

The decoding device shown in FIG. 2 is one to be associated with the coding device shown in FIG. 1. In FIG. 2, a multiplexed data train input from a data input terminal 31 is demultiplexed to data trains of the pictures a and b. The data train of the picture a is supplied to a buffer 53 and the data train of the picture b is supplied to a buffer 64.

The data train of the picture a is written in the buffer 53 at a constant speed, read out therefrom at a speed matched with a timing of a decoding processing to be performed in a decoder 58 and supplied to the decoder 58. The decoder 58 performs a similar processing to that performed in the coding device shown in FIG. 1 and outputs a reproduced residual signal. The reproduced residual signal is supplied to an adder 57.

The adder 57 adds a predictive signal supplied from an inter-frame predictor 55 to the reproduced residual signal and outputs a reproduced picture signal of the picture a. The reproduced picture signal is supplied to the inter-frame predictor 55 and an output terminal 59.

The inter-frame predictor 55 delays the reproduced picture signal by 1 frame and outputs it as an inter-frame predictive signal. The inter-frame predictive signal is supplied to the adder 57 through a switch 54. The switch 54 cuts the inter-frame predictive signal according to the picture type information separated by a demultiplexer 33.

On the other hand, operations of a buffer 63, a decoder 68, an adder 67 and an inter-frame predictor 65 are the same as those of the buffer 53, the decoder 58, the adder 57 and the inter-frame predictor 55, respectively, and the reproduced picture signal of the picture b is output from an output terminal 69.

The buffer capacity corresponds to a maximum variation with respect to a fixed transfer rate of the generated code amount. The larger the variation requires the larger the capacity.

On the other hand, since the coding and decoding processing is performed in synchronism with the input of the moving picture signal, the delay time between the data input to the buffer on the coding side and the data output from the buffer on the decoding side becomes constant. That is, when the delay is large due to accumulation of a large amount of data in the coding side buffer, the amount of data accumulated in the decoding side buffer and hence the delay is small. On the contrary, when the delay is small due to small amount of data accumulated in the coding side buffer, the amount of data accumulated in the decoding side buffer and hence the delay becomes large. Therefore, a total amount of data accumulated in the both buffers is equal to the capacity of one buffer. Further, the capacity of the coding side buffer is the same as that of the decoding side buffer and the both buffers operate complementarily.

From the foregoing, it is clear that the amount of delay is a quotient of a division of the capacity of one buffer by the transfer rate. For example, when the buffer capacity is 1 Mbit and the transfer rate is 5 Mbps, the delay becomes 0.2 seconds. With the same buffer capacity, the lower the transfer rate provides the larger the delay and, with the same transfer rate, the larger the buffer capacity provides the larger the delay.

In the inter-frame prediction coding, the amount of code of the intra-frame (I frame) is 5 to 10 times that of the unidirectionally predictive frame (P frame). Therefore, the generated code amount varies substantially frame to frame and, in order to absorb such large variation, the buffers having large capacity are required, by which the signal delay becomes large.

When a portion of the frame is independently coded in order to reduce the code amount variation, a high speed search picture during a VTR recording/reproducing is divided, causing a monitor to be difficult.

Further, the code amount of the unidirectionally predictive frame (P frame) in which the inter-frame prediction is performed by using a predictive signal produced from a preceding frame in time is 2 to 5 times that of the bidirectionally predictive frame (B frame) in which the inter-frame prediction is performed by using a preceding and succeeding frames in time. Therefore, in order to absorb the variation, buffers having large capacity are required as in the case of the intra-frame (I frame).

Further, the same problem exists even if the frame unit is changed to the field unit.

BRIEF SUMMARY OF THE INVENTION

An object of the present invention is to provide a moving picture coding device which is capable of reducing a variation of a totally generated code amount after a plurality of moving pictures are coded and multiplexed and whose buffer capacity and signal delay are small.

Another object of the present invention is to provide a moving picture coding device for coding a plurality of moving picture signals in parallel and multiplexing them, comprising a plurality of coding means responsive to a control signal for periodically performing, with respect to the respective moving picture signals, a first coding and a second coding having a code amount of field or frame larger than that of the first coding, multiplexing means for multiplexing codes outputted from the plurality of the coding means and coding control means responsive to the plurality of the moving picture signals for generating the control signal to control the plurality of the coding means such that a timing of the second coding is not overlapped in the plurality of the coding means.

According to the coding device of the present invention, the possibility of simultaneous occurrence of coding in which an amount of code generated is larger than an average amount in a plurality of channels is reduced by controlling the coding such that the coding in which a larger amount of code is generated is not overlapped between picture signals of a plurality of channels and, hence, the variation of the total amount of generated code of the plurality of the channels is reduced. Therefore, the capacity of the buffer provided after the multiplexing means can be as small as that of 1 channel before multiplexing. Further, since the transfer rate is increased by the multiplexing, the signal delay in the buffer is reduced.

DETAILED DESCRIPTION OF THE INVENTION

First Embodiment of the Coding Device

Figure 3:
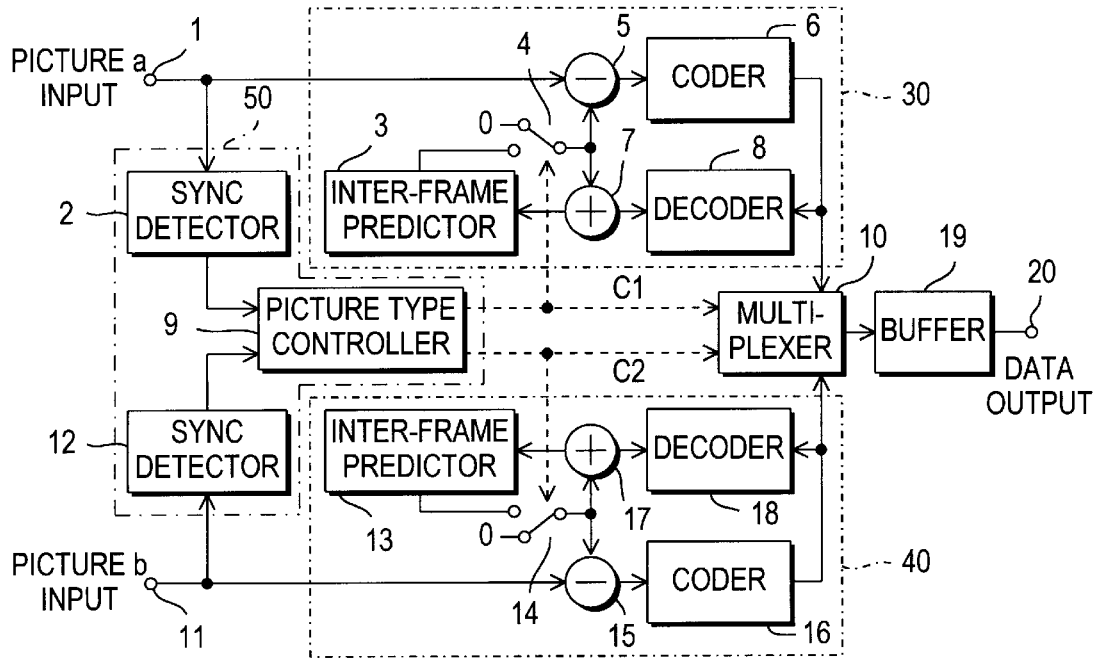
FIG. 3 is a block diagram showing a first embodiment of the coding device according to the present invention.

FIG. 3 is a block diagram showing a first embodiment of the moving picture coding device according to the present invention.

Figure 1:
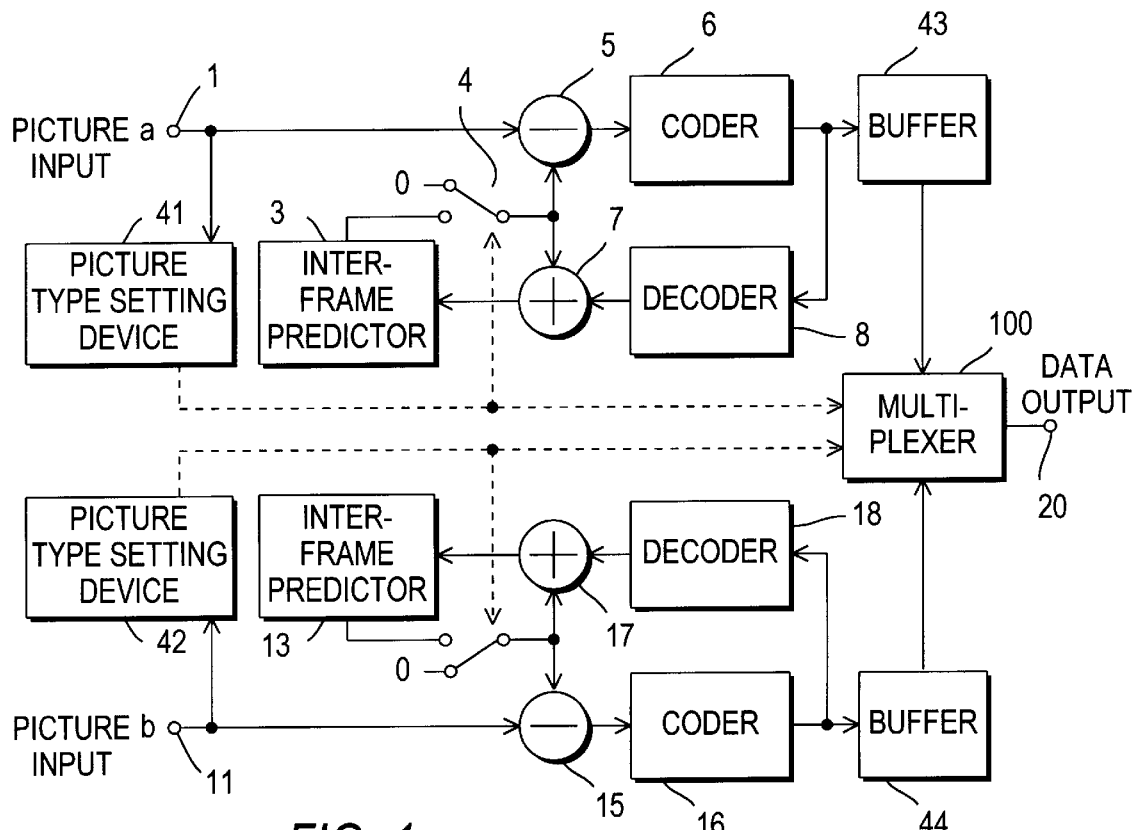
FIG. 1 is a block diagram showing an example of a conventional coding device.

The coding device shown in FIG. 3 differs from the conventional coding device shown in FIG. 1 in mainly the picture type setting method and the buffer construction. That is, the differences of the first embodiment from the conventional device are that, instead of the picture type setting devices 41 and 42 in FIG. 1, a coding controller 50 composed of sync detectors 2 and 12 and a picture type controller 9 is provided and that, instead of the buffers 43 and 44 in FIG. 1, a buffer 19 is provided on an output side of a multiplexer 10. The coding section of the first embodiment of the present invention is represented in FIG. 3 by the blocks 30 and 40.

Coding Process

In FIG. 3, a signal of a picture a inputted from an input terminal 1 is supplied to a subtracter 5 and the sync detector 2. The subtracter 5 subtracts a prediction signal supplied from an inter-frame predictor 3 from the input signal a. A residual signal obtained from the subtracter 5 is supplied to a coder 6.

In the coder 6, the DCT is performed. A coefficient obtained by the DCT is quantized with a predetermined step width and then variable-length coded. A data train thus compressed is supplied to the multiplexer 10 and a decoder 8.

The decoder 8 performs a processing which is reverse to that performed by the coder 6 and outputs a reproduced residual signal. An adder 7 adds a prediction signal supplied from the inter-frame predictor 3 to the reproduced residual signal supplied from the decoder 8. The reproduced picture signal output from the adder 7 is sent to the inter-frame predictor 3. The inter-frame predictor 3 delays the reproduced picture signal by 1 frame and outputs it as a inter-frame prediction signal which is supplied to the subtracter 5 and the adder 7 through a switch 4.

A movable terminal of the switch 4 is connected to the inter-frame predictor 3 when a picture type information supplied from the picture type setting device 41 indicates a P frame and is connected to the 0 value and cuts the predictive signal when the picture type is an I frame. When the predictive signal is cut, the input picture signal is supplied to the coder 6 as it is, so that the intra-frame independent coding is performed.

A signal of a picture b inputted from an input terminal 11 is supplied to a subtracter 15 and the sync detector 12. Operations of the subtracter 15 and a coder 16 for the picture b are the same as those of the subtracter 5 and the coder 6 for the picture a.

The multiplexer 10 multiplexes the output of the coder 6, which is the data train of the picture a, with an output of the coder 16, which is a data train of the picture b. A resultant multiplexed data train is supplied to the buffer 19. The buffer 19 absorbs a variation of the amount of code caused by the variable-length coding to make the transfer rate of the data train substantially constant. The data train output from the buffer 19 is output from a data output terminal 20.

Coding Control

Next, an operation of the coding controller 50 for generating a picture type control information (control signals C1 and C2) for controlling the switches 4 and 14 will be described.

The sync detector 2 detects a timing of frame synchronization of the signal of the picture a, that is, a timing of a head of the frame. The sync detector 12 detects a timing of frame synchronization of the signal of the picture b. The frame synchronization detected are supplied to the picture type controller 9. In the picture type controller 9, the control signal C1 is generated from the frame synchronization of the picture a, with which a frame is assigned as an independent frame every 10 to 30 frames of the picture a.

Then, the picture type controller 9 operates to obtain a timing which is substantially an intermediate between the frame synchronization timing of the I frames of the picture a and obtain a frame of the picture b which is closest to this timing and generates the control signal C2 with which a frame of the picture b immediately after the closest frame is assigned as an independent frame.

The picture type information (control signals C1 and C2) of the pictures a and b thus obtained are supplied to the switches 4 and 14, multiplexed by the multiplexer 10 and sent to a decoding device.

FIG. 4 shows the picture type and the amount of generated code in the coding device of the first embodiment.

In FIG. 4, I and P represent intra-frame (I frame) and unidirectional predictive frame (P frame), respectively.

Figure 4A:
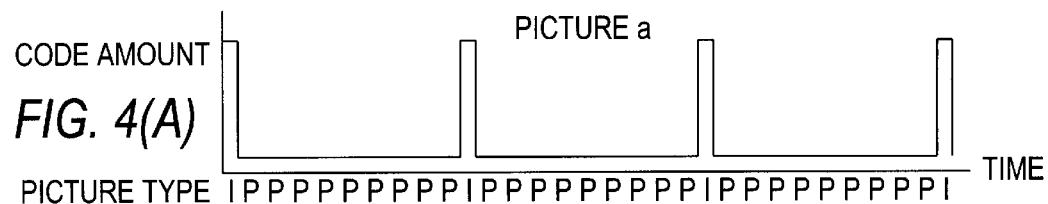
FIG. 4(A)–(C) illustrates a picture type and an amount of code in the coding device of the first embodiment.
Figure 4B:
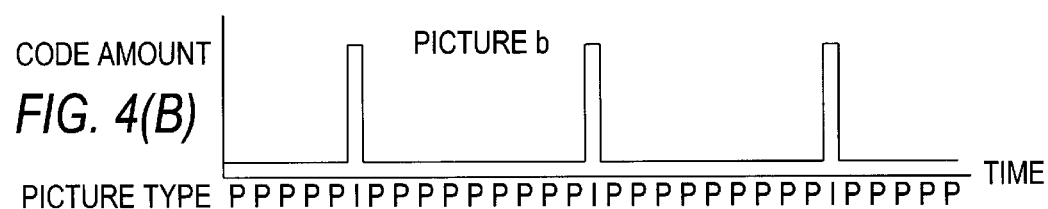
Figure 4C:
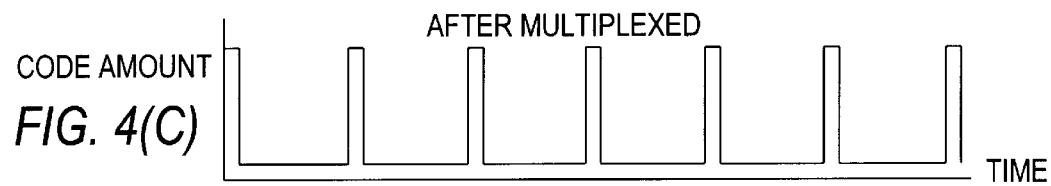

In FIG. 4, a variation of code amount per 1 picture signal (1 channel) is the same as that in the conventional coding device as shown in FIGS. 4(A) and 4(B). However, a variation in the case where 2 channels are multiplexed is not twice that of 1 channel but the same as that is the case of 1 channel as shown in FIG. 4(C) since the timing of the I frame of the picture a is deviated from that of the picture b. That is, the ratio of variation with respect to the average rate is reduced to a half. Therefore, the capacity of the buffer 19 is not a sum of those of the buffers 43 and 44 shown in FIG. 1 and may be substantially the same as that of either of the buffers 43 and 44. Since the transfer rate is twice, the delay time due to the buffer is substantially reduced.

When the number of picture signals (channels) to be multiplexed is larger than 2, an arrangement of independent pictures is performed correspondingly to the number of channels in the picture type controller 9. For example, when pictures of N channels are to be multiplexed, the I frames are set for the first channel as in the above mentioned manner. Then, for each of the second and subsequent channels, the I frames are set at time points obtained by dividing one period Ti of the I frame of the first channel by N is assigned. That is, the I frames are assigned to the respective division points Ti/N at regular intervals. In each of the second and subsequent channels, a frame which is closest to each of the division points is made the I frame. Therefore, after Ti/N lapses from a start time Ta of the I frame of, for example, the picture a, the independent coding is performed by using a different coder. When the number of channels to be multiplexed is 3 or more, the variation of the generated code amount with respect to the transfer rate after multiplexed becomes smaller than that in the case of the 2 channels and thus the present method becomes more effective.

Decoding Device

Figure 5:
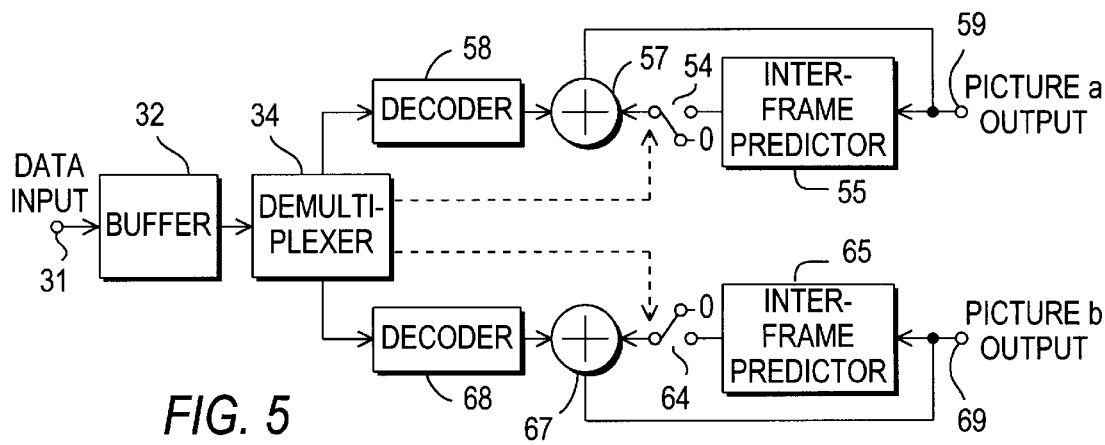
FIG. 5 is a block diagram showing an embodiment of a decoding device according to the present invention.

FIG. 5 is a block diagram of an embodiment of a decoding device according to the present invention, which may be associated with the coding device shown in FIG. 3.

Figure 2:
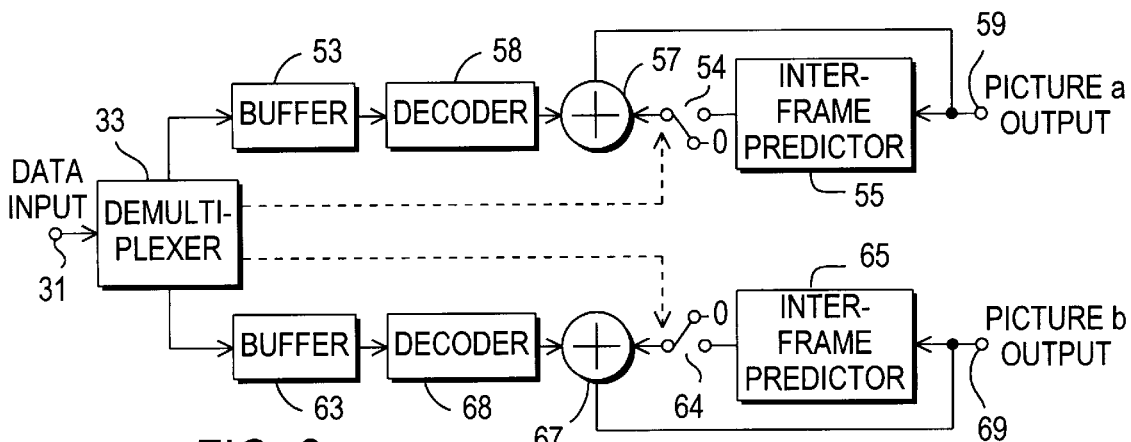
FIG. 2 is a block diagram showing an example of a conventional decoding device.

The decoding device shown in FIG. 5 differs from the conventional decoding device shown in FIG. 2 mainly in that, instead of the buffers 53 and 64 in FIG. 2, a buffer 32 is provide on an input side of a demultiplexer 34.

In FIG. 5, a multiplexed data train input to a data input terminal 31 is supplied through the buffer 32 to the demultiplexer 34. The demultiplexer 34 separates the data train of the picture a from the data train of the picture b and supplies the data trains of the pictures a and b to decoders 58 and 68, respectively. The decoder 58 operates to perform the similar processing to that performed in the coding device shown in FIG. 1 and outputs a reproduced residual signal which is supplied to an adder 57. The adder 57 adds the reproduced residual signal to a prediction signal supplied from an inter-frame predictor 55 and outputs a reproduced picture signal of the picture a, which is supplied to the inter-frame predictor 55 and an output terminal 59. The inter-frame predictor 55 delays the reproduced picture signal by 1 frame and outputs it as an inter-frame prediction signal which is supplied through a switch 54 to the adder 57. The switch 54 cuts the inter-frame prediction signal according to the picture type information separated by the demultiplexer 34.

Operations of the decoder 68, an adder 67 and an inter-frame predictor 65 are the same as those of the decoder 58, the adder 57 and the inter-frame predictor 55, respectively, and a reproduced picture signal of the picture b which is obtained similarly is outputs from an output terminal 69.

Second Embodiment of the Coding Device

Figure 6:
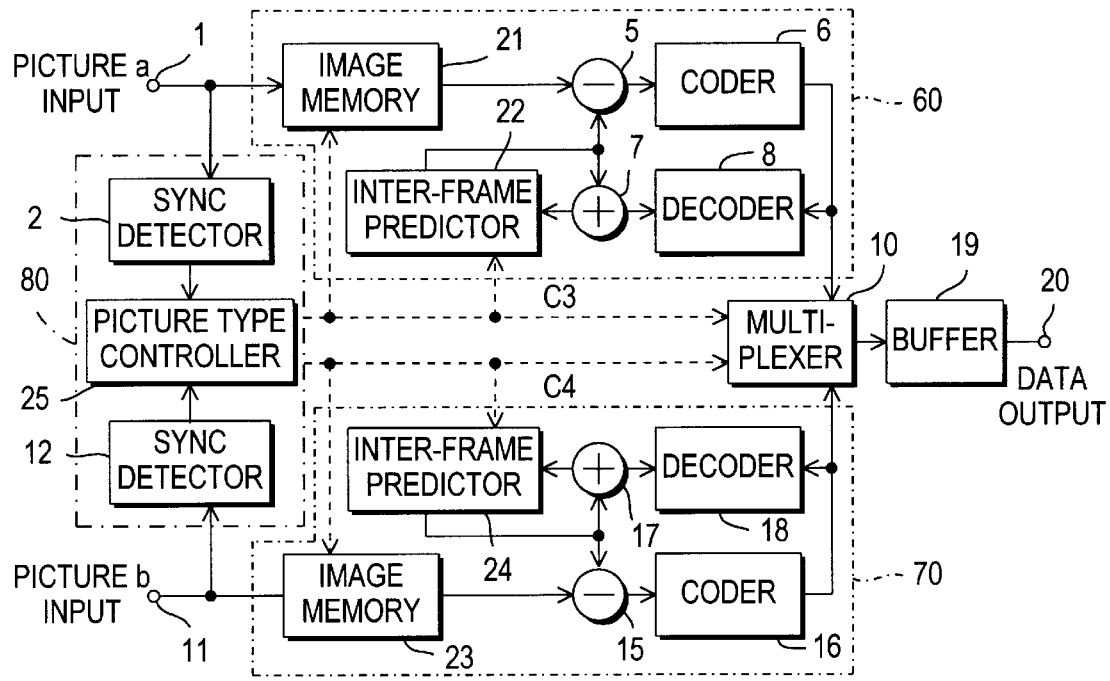
FIG. 6 is a block diagram showing a second embodiment of the coding device according to the present invention.

FIG. 6 is a block diagram of a second embodiment of the moving picture coding device according to the present invention in which the inter-frame prediction is performed using the bidirectional prediction frame (B frame) such as used in the MPEG system. In this case, since the code amount of the P frame is 2 to 5 times the code amount of the B frame, the generated code amount varies as in the first embodiment. It should be noted that, in the second embodiment, there is no I frame set. The coding section of this second embodiment is represented by the blocks 60 and 70 as shown in FIG. 6.

Coding Process

In FIG. 6, a signal of a picture a input from an input terminal 1 is supplied to an image memory 21 and a sync detector 2, and a signal of a picture b input from an input terminal 11 is supplied to an image memory 23 and a sync detector 12. The image memories 21 and 23 transpose an order of frames of the picture signals according to a picture type control information (information indicating P frame or B frame) supplied from a picture type controller 25. The P frames are output without delay and the B frames are output after delayed by a time corresponding to an interval of the P frames. This is because, in order to perform an inter-frame prediction of the B frame, reproduced pictures of the P frames preceding and succeeding the B frame are necessary. The outputs of the image memories 21 and 23 are supplied to subtracters 5 and 15, respectively.

Operations of the prediction signal subtracters 5 and 15, coders 6 and 16, a multiplexer 10, a buffer 19 and decoders 8 and 18 are the same as those of the first embodiment shown in FIG. 3. Unlike the inter-frame predictors 3 and 13 in FIG. 3, the prediction processing method performed in inter-frame predictors 22 and 24 is changed according to the picture type control information. That is, a P frame is predicted by using a preceding P frame and a B frame is predicted by using both a preceding and succeeding P frames.

Picture Type Control

The sync detector 2 detects a timing of frame synchronization of the picture signal of the picture a and the sync detector 12 detects a timing of frame synchronization of the picture signal of the picture b. The detected timing are supplied to the picture type controller 25. The picture type controller 25 generates a control signal C3 from the frame synchronization of the picture a, with which a P frame for the picture a is set every 2 to 4 frames of the picture a. Further, the picture type controller 25 detects a timing which is substantially an intermediate time point of the P frame timing of the picture a, obtains a frame synchronization of the picture b, which is closest to the intermediate timing and generates a control signal C4 with which the closest frame becomes the timing of the P frame.

The picture type information of the picture a (control signal C3) thus obtained is supplied to the image memory 21, the inter-frame predictor 22 and the multiplexer 10 and the picture type information of the picture b (control signal C4) is supplied to the image memory 23, the inter-frame predictor 24 and the multiplexer 10. The picture type information of the pictures a and b are multiplexed by the multiplexer 10 and sent to the decoding device via the buffer 19.

Figure 7A:
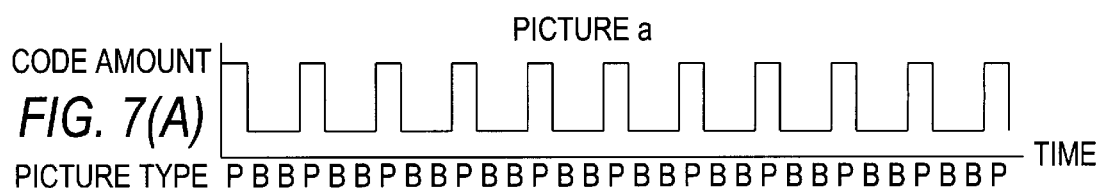
FIG. 7(A)–(C) illustrates a picture type and an amount of code in the coding device of the second embodiment.
Figure 7B:
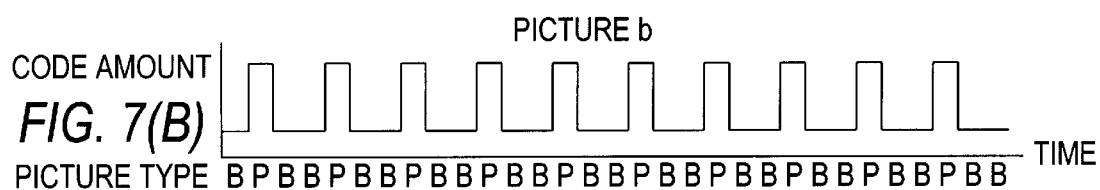
Figure 7C:
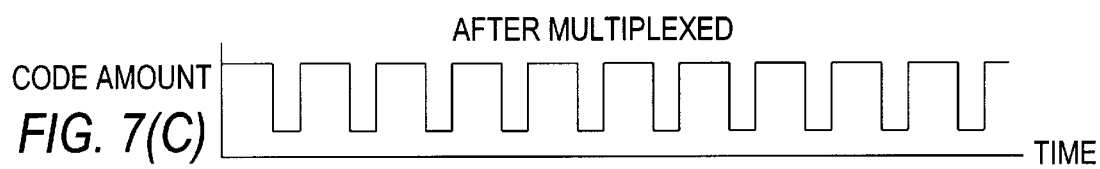

FIG. 7 illustrates the picture type and the generated code amount in the coding device according to the second embodiment. As shown in FIGS. 7(A) and 7(B), the timing of variation of the code amount by the P frame is different between the picture a and the picture b. Therefore, as shown in FIG. 7(C), the variation of code amount of the multiplexed pictures is not twice but equal to that of 1 channel as in the case of the first embodiment. Consequently, the capacity of the buffer 19 corresponding to 1 picture signal (1 channel) is enough, resulting in a substantial reduction of the picture signal delay.

As shown in FIG. 7, in the moving picture coding device according to the present invention, after a time Tp/N lapses from a start time Ta of a P frame of, for example, the picture a, the unidirectional prediction coding is performed by a different coder, where Tp is a period of the P frame of a certain picture and N is the number of the picture channels.

What is claimed is:

1. A moving picture coding apparatus for coding a plural channel of moving picture signals in parallel and multiplexing them, comprising:

a plural channel of sync detecting means for generating detected synchronization signals upon detecting a frame or field synchronization signals of moving picture signals;

a plural channel of coding means, for periodically performing coding and decoding processing with respect to the plural channel of moving picture signals to provide intra-frame or intra-field independent coding (I) and unidirectional predictive inter-frame or inter-field coding (P) thus output data codes;

coding control means, responsive to said plural channel of detected synchronization signals for generating control signals from the detected synchronization signals generated by the sync detecting means having a controlled time relationship wherein a first control signal is generated from the frame synchronization timing of a first channel setting of (I) frame or field moving picture signals and a second control signal is generated to obtain a timing which is displaced from the frame synchronization timing of the first control signal such that the timing of the intra-frame or intra-field independent coding (I) frame or field from one plural channel is spaced apart in time from the timing of the intra-frame or intra-field independent coding (I) frame or field for each other plural channel with the timing of the intra-frame or intra-field independent coding (I) being performed at substantially regular intervals;

multiplexing means, responsive to said control signals for multiplexing the output data codes outputted from said plural channel of coding means; and buffer means connected to the output of said multiplexing means for absorbing a variation of a code amount of the multiplex output data codes from the multiplexing means to cause the transfer rate of the multiplexed output data codes to be substantially constant.

2. A moving picture coding apparatus for coding a plural channel of moving picture signals in parallel and multiplexing them, comprising:

a plural channel of sync detecting means for generating detected synchronization signals upon detecting the frame or field synchronization signals of moving picture signals;

a plural channel of coding means, for periodically performing coding and decoding processing with respect to the plural channel of moving picture signals to provide unidirectional predictive inter-frame or inter-field coding (P) and bidirectional predictive inter-frame or inter-field coding (B) thus output data codes;

coding control means, responsive to said plural channel of detected synchronization signals for generating control signals from the detected synchronization signals generated by the sync detecting means having a controlled time relationship wherein a first control signal is generated from a frame synchronization timing of a first channel setting of (P) frame or field moving picture signals and a second control signal is generated to obtain a timing which is displaced from the frame synchronization timing of the first control signal such that the timing of the unidirectional predictive inter-frame or inter-field coding (P) frame or field from one plural channel is spaced apart in time from the timing of the inter-frame or inter-field coding (P) frame or field for each other plural channel and with the timing of the unidirectional predictive inter-frame or inter-field coding (P) being performed at substantially regular intervals;

multiplexing means, responsive to said control signals for multiplexing the output data codes outputted from said plural channel of coding means; and buffer means connected to the output of said multiplexing means for absorbing a variation of a code amount of the multiplex output data codes from said multiplexing means to cause the transfer rate of the multiplexed output data codes to be substantially constant.

* * * * *